United States Patent
Xu (12) 
(10) Patent No.: US 11,890,540 B2
(45) Date of Patent: Feb. 6, 2024

(54) USER INTERFACE PROCESSING METHOD AND DEVICE

(71) Applicant: NETEASE (HANGZHOU) NETWORK CO., LTD., Hangzhou (CN)

(72) Inventor: Liang Xu, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 384 days.

(21) Appl. No.: 17/277,287

(22) PCT Filed: Jun. 5, 2019

(86) PCT No.: PCT/CN2019/090166
§ 371 (c)(1),
(2) Date: Mar. 17, 2021

(87) PCT Pub. No.: WO2020/143159
PCT Pub. Date: Jul. 16, 2020

(65) Prior Publication Data
US 2022/0032192 A1    Feb. 3, 2022

(30) Foreign Application Priority Data

Jan. 8, 2019    (CN) .......................... 201910016948.9

(51) Int. Cl.
*A63F 13/537*    (2014.01)
*G06F 9/451*    (2018.01)
*G06F 9/54*    (2006.01)

(52) U.S. Cl.
CPC ............ *A63F 13/537* (2014.09); *G06F 9/451* (2018.02); *G06F 9/542* (2013.01)

(58) Field of Classification Search
CPC .... A63F 13/537; A63F 13/335; A63F 13/533; A63F 13/77; G06F 9/451; G06F 9/542; G06F 2209/545
(Continued)

(56) References Cited

U.S. PATENT DOCUMENTS 9,352,225 B2 *  5/2016  Ruke .................... A63F 13/323
10,758,825 B2 *  9/2020  Tartaj ................... A63F 13/335
(Continued)

FOREIGN PATENT DOCUMENTS

CN    102915366 A    2/2013
CN    102999332 A    3/2013
(Continued)

OTHER PUBLICATIONS

The International Search Report dated Oct. 9, 2019 from international application No. PCT/CN2019/090166 by the WIPO.
(Continued)

*Primary Examiner* — Pierre E Elisca
(74) *Attorney, Agent, or Firm* — Qinghong Xu (57) ABSTRACT

Disclosed are a user interface processing method and device. The method is applied to a user terminal which is configured to execute a game client, the game client comprises a first thread and a second thread, and the second thread is pre-packaged in a browser kernel of the game client, and the method includes: obtaining, by the first thread, a user interface rendering event which is to be processed: obtaining by the second thread, a to-be-rendered object corresponding to the user interface rendering event; rendering, by the second thread, the to-be-rendered object, and sending a rendering result to the first thread through a first interface, wherein the first interface is an interface provided by the second thread for storing the rendering result; and presenting, by the first thread, the rendering result.

18 Claims, 3 Drawing Sheets

(58) Field of Classification Search
USPC .......................................................... 463/31
See application file for complete search history.

(56) References Cited

U.S. PATENT DOCUMENTS

| | | | |
|---|---|---|---|
| 11,596,863 B2* | 3/2023 | Tartaj | ..................... A63F 13/335 |
| 2009/0079763 A1* | 3/2009 | Takeichi | ............... G06T 15/005 |
| | | | 345/522 |
| 2009/0157223 A1 | 6/2009 | Park et al. | |
| 2011/0219130 A1 | 9/2011 | Allen et al. | |
| 2019/0126150 A1* | 5/2019 | Tartaj | ..................... A63F 13/335 |
| 2020/0398164 A1* | 12/2020 | Tartaj | ................... A63F 13/5372 |
| 2023/0218999 A1* | 7/2023 | He | ........................ A63F 13/847 |
| | | | 463/31 |

FOREIGN PATENT DOCUMENTS

| | | |
|---|---|---|
| CN | 103942823 A | 7/2014 |
| CN | 104063460 A | 9/2014 |
| CN | 105741227 A | 7/2016 |
| CN | 106354512 A | 1/2017 |
| CN | 107656759 A | 2/2018 |
| CN | 107729094 A | 2/2018 |
| CN | 107800769 A | 3/2018 |
| CN | 108572818 A | 9/2018 |
| CN | 109011573 A | 12/2018 |
| CN | 109739505 A | 5/2019 |
| EP | 2584464 A2 | 4/2013 |

OTHER PUBLICATIONS

Fundamentals of computer software applications for college-multimedia technology and application, Liu Qiang, Yan Tianshu, Zeng Zhigao, p. 229, Zhongnan University Press, Feb. 2016.
The 1st Office Action dated Sep. 10, 2019 from application No. 2019100169489 by the CNIPA.
The Notice of Allowance dated Oct. 29, 2019 from application No. 2019100169489 by the CNIPA.

* cited by examiner

USER INTERFACE PROCESSING METHOD AND DEVICE

CROSS-REFERENCE OF RELATED APPLICATIONS

This application is based on International Application No. PCT/CN2019/090166, filed Jun. 5, 2019, which claims priority to Chinese Patent Application 201910016948,9, filed Jan. 8, 2019, and titled "USER INTERFACE PROCESSING METHOD AND DEVICE", the entire contents of which are incorporated herein by reference.

TECHNICAL FIELD

The present disclosure relates to game technologies, and in particular, to a user interface processing method and a user interface processing device.

BACKGROUND

At present, in game interaction interfaces, it is often needed to display game objects and various information of the game objects. For example, in Massive Multiplayer Online Role-Playing Game (MMORPG), Action Role Playing Game (ARPG) and other mobile platform game applications, full-screen mode and pop-up mode are often involved for presenting User Interface (UI) for game interaction.

During the maintenance and update of games, the user interface needs to be changed and the UI layout or interaction processes may be updated. Currently, a large number of UIs are based on native UIs, that is, using local pictures and other related resources. However, this will generate a large number of patches to update local resources, and frequent changes may cause resource redundancy, resulting in the gradual increase of the package.

At present, most games use the embedded browser. An embedded browser may be opened in the game, and then the relevant activity interface is shown. The Web technology is used flexibly, which reduces the development cost and makes the page easier to maintain. However, using the embedded browser will cause the browser interface to completely cover the entire interface of the client, the UI of the native layer is blocked, and the relevant prompts in the game cannot be seen by players, affecting the players' interactive experience. Even if pages of the browser maintain the same style as the native UI, players may still have the feeling of inconsistency, which cannot bring users a good gaming experience.

It should be noted that the information disclosed in the background section above is only used to enhance the understanding of the background of the present disclosure, and therefore may include information that does not constitute the prior an known to those skilled in the art.

SUMMARY

An objective of the present disclosure is to provide a user interface processing method and a corresponding user interface processing device, so as to overcome, at least to some extent, one or more problems as described above.

Aiming at the above technical problem, an embodiment of the present disclosure provides a user interface processing method, applied to a user terminal, wherein the user terminal is configured to execute a game client, the game client includes a first thread and a second thread, and the second thread is pre-packaged in a browser kernel of the game client. The method includes:
  obtaining, by the first thread, a user interface rendering event which is to be processed;
  obtaining, by the second thread, a to-be-rendered object corresponding to the user interface rendering event;
  rendering, by the second thread, the to-be-rendered object, and sending a rendering result to the first thread through a first interface, wherein the first interface is an interface provided by the second thread for storing the rendering result; and
  presenting, by the first thread, the rendering result:

An embodiment of the present disclosure provides a user interface processing device, applied to a user terminal, wherein the user terminal is configured to execute a game client, the game client includes a first thread and a second thread, and the second thread is pre-packaged in a browser kernel of the game client, and the method includes:
  a rendering event obtaining module configured to control the first thread to obtain a user interface rendering event which is to be processed;
  a rendering object obtaining module configured to control the second thread to obtain a to-be-rendered object corresponding to the user interface rendering event;
  a rendering object processing module configured to control the second thread to render the to-be-rendered object, and sending a rendering result to the first thread through a first interface, wherein the first interface is an interface provided by the second thread for storing the rendering result; and
  a rendering result presenting module configured to control the first thread to present the rendering result.

An embodiment of the present disclosure provides a device, including:
  one or more processors; and
  one or more machine-readable mediums having instructions stored thereon, wherein when the instructions are executed by the one or more processors, the device is caused to perform the user interface processing method described above.

An embodiment of the present disclosure provides one or more machine-readable medium having instructions stored thereon, wherein when the instructions are executed by one or more processors, the one or more processors are caused to perform the user interface processing method described above.

It should be understood that the above general description and the following detailed description are merely exemplary and explanatory, and should not limit the present disclosure.

DETAILED DESCRIPTION

In order to make the above objectives, features and advantages of the present disclosure more clear and understandable, the disclosure will be described in detail with reference to the accompanying drawings.

Figure 1:
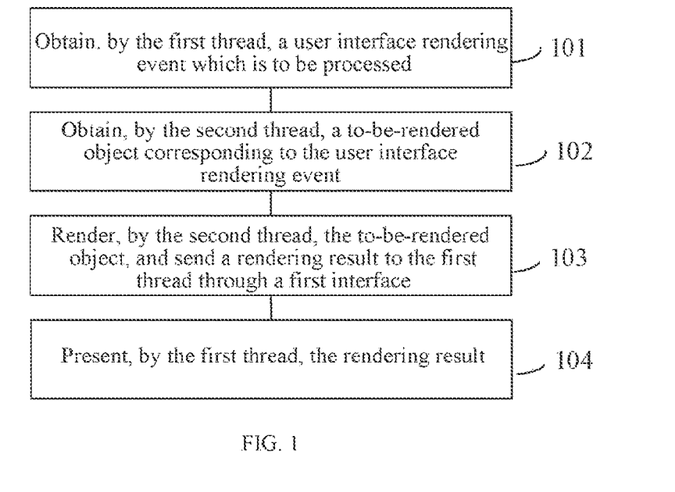
FIG. 1 is a flowchart of a user interface processing method according to an embodiment of the present disclosure.

FIG. 1 is a flowchart a user interface processing method according to an embodiment of the present disclosure. The method is applied to a user terminal, and the user terminal is configured to execute a game client. The game client includes a first thread and a second thread. The method may include the following steps:

In step 101, the first thread obtains a user interface rendering event which is to be processed.

In embodiments of the present disclosure, the method is applied to a user terminal, for example, a mobile phone, a tablet computer, a portable computer, a desktop computer, a personal digital assistant, etc. These terminals may support operating systems like Windows, Android, iOS, Windows-Phone, or may support embedded systems. The game client can run in the user terminal, and multiple threads are executed in the game client, which may include a user interface display thread, a user interface rendering thread, a game data processing thread, a game chat processing thread, and so on. The game client may include a mobile game client, an online game client, or a web game online page.

In an online games, a user can log in to the game client through an account and enter the game. After entering the game, the game client includes a large number of user interfaces through which the user interacts with the game. The game client can render user interfaces, or design layout of user interfaces, depending on own style of the game client. Also, user interfaces for festival activity on a specific day may be set.

The principles of the present disclosure will be described taking a smart terminal installed with an Android system as an example. However, this is only exemplary, and the scope of the present disclosure is not limited thereto, and the principles of the present disclosure can be applied to smart terminals installed with other operating systems (such as Linux, iOS, Window Phone, Symbian, etc.)

In Android development, due to the severe fragmentation of the Android system, developers spend most of their time on the adaptation of the user interface. Using native controls to perform development is time-consuming and labor-intensive, and when implementing complex interfaces, the layout capabilities of native controls are weak. JsBridge can realize the logical interaction and data exchange between the interfaces and the system.

In embodiments of the present disclosure, a browser kernel is pre-packaged in the game client as a thread used for user interface rendering in the game client. The browser kernel provides a rendering event processing interface and a click event processing interface. The first thread in the game client is a user interface display thread, which is responsible for acquiring a user interface processing event for the game client's user interface and a user interface click event. The first thread can use the interface provided by the browser kernel to perform data exchange with the browser kernel.

In embodiments of the present disclosure, after a user logs in to the game client, the game client needs to perform user interface processing, so that the user can perform relevant game interactions. When it is detected that the user logs in to the game client, the first thread may obtain a user interface rendering event which is to be processed. The user interface rendering event may include a main user interface rendering and a sub-interface rendering.

In an implementation, the main interface for the user may include a plurality of corresponding button icons, and each main interface and each button icon correspond to a URL (Uniform Resource Locator), and the texture data corresponding to the button icon can be obtained by the URL. The button icons can include an activity icon and a functional icon. When the user clicks the activity icon, the user interface can display the corresponding activity sub-interface. When the user clicks the functional icon, the game client can execute corresponding operations according to the function corresponding to the functional icon.

When the user interface is opened, the user interface display thread can obtain the user interface to be rendered and the button icon to be rendered, and obtain the rendering object corresponding to the user interface and the button icon. The rendering object is texture data and each texture data corresponds to a URL identifier.

Figure 2:
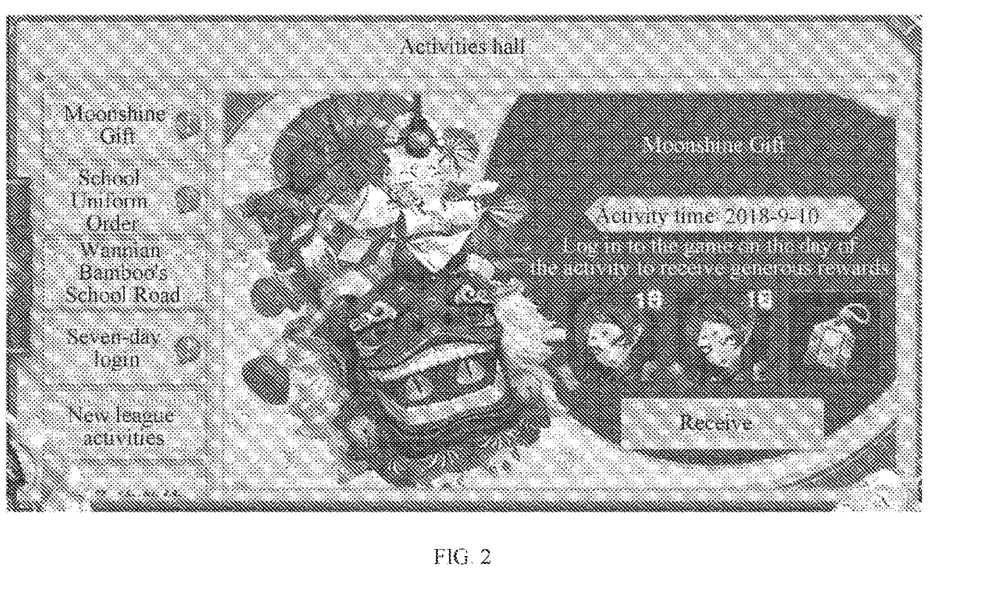
FIG. 2 is a schematic diagram showing a user interface in a user interface processing method according to an embodiment of the present disclosure.

In an example, a rendered user interface is used for illustration. FIG. 2 shows a schematic diagram of a user interface in a user interface processing method according to an embodiment of the present disclosure. In the main interface of the activities hall, a plurality of button icons are shown, including "Receive", "Moonshine Gift", "School Uniform Order", "Wannian Bamboo's School Road", "Seven-day login", "New linkage activities" and so on. The button icons "Moonshine Gift", "School Uniform Order", "Wannian Bamboo's School Road", "Seven-day login", and "New linkage activities" are activity icons, and "Receive" is a functional icon. When the user interface is opened, the user interface displays thread obtains the to-be-processed rendering event of the user interface, and obtains the URL identifier of the texture data corresponding to the rendering event, such as obtaining the active sub-interface corresponding to the "Moonshine Gift" to be rendered, and obtaining the URL corresponding to the texture data.

In step 102, the second thread obtains the to-be-rendered object corresponding to the user interface rendering event.

In embodiments of the present disclosure, after the first thread obtains the user interface rendering event which is to be processed and obtains the URL identifier corresponding to the rendering object, the URL identifier may be sent to the second thread through the first interface, and the second thread may obtain the rendering object corresponding to the user interface rendering event by the URL identifier.

In an implementation, when the user opens the user interface, the user interface display thread obtains the URL identifier of the rendering object corresponding to the user interface rendering event, the URL identifier is sent to the browser kernel through the rendering event processing interface provided by the browser kernel, requesting to render the image to be rendered. After obtaining the URL identifier of the to-be-rendered object, the browser kernel may obtain corresponding texture data according to the identifier.

FIG. 2 shows a schematic diagram of a user interface in a user interface processing method according to an embodiment of the present disclosure. The user interface includes activities like "Moonshine Gift" and "School Uniform Order".

In step 103, the second thread renders the to-be-rendered object, and sends the rendering result to the first thread through the first interface.

In embodiments of the present disclosure, after obtaining the URL of the to-be-rendered object and obtaining texture data according to the URL, the second thread may render the texture data and send the rendering result to the first thread through the first interface.

In an implementation, the browser kernel parses the URL identifier and obtains the corresponding texture data, and then renders the texture data. After the rendering is completed, the rendering result of each frame is stored in the rendering event processing interface in the format of bitmap, and the user interface display thread obtains the corresponding rendering result through the rendering event processing interface.

In step 104, the first thread presents the rendering result.

In embodiments of the present disclosure, the first thread may obtain the rendering result corresponding to the user interface rendering event which is to be processed from the rendering event processing interface and present the rending result.

FIG. 2 shows a schematic diagram of a user interface in a user interface processing method according to an embodiment of the present disclosure. The user interface display thread obtains the rendering result from the rendering event processing interface provided by the browser kernel, and display the rendering result. When the user opens the user interface, the game client presents the user interface as shown in FIG. 2. By encapsulating or packaging the browser kernel in the game client, the user interface can be rendered more efficiently. The interface rendering ensures the consistency of the native WebView experience on the Android platform, and also ensures that the iOS platform and the Android platform have the same interface, which is easy to maintain the game.

The embodiments of the present disclosure are applied to a user terminal that is configured to execute a game client. The game client includes a first thread and a second thread, and the second thread is a browser kernel pre-packaged in the game client. The first thread obtains the user interface rendering event which is to be processed, then the browser kernel obtains the to-be-rendered object corresponding to the user interface rendering event, the browser kernel renders the to-be-rendered object, and sends the rendering result to the first thread through the first interface, and then the first thread displays the rendering result. In this way, the browser kernel performs the silent rendering in the background, and thus the user interface can be rendered more efficiently, thereby ensuring the consistency of the experience of the native WebView.

Figure 3:
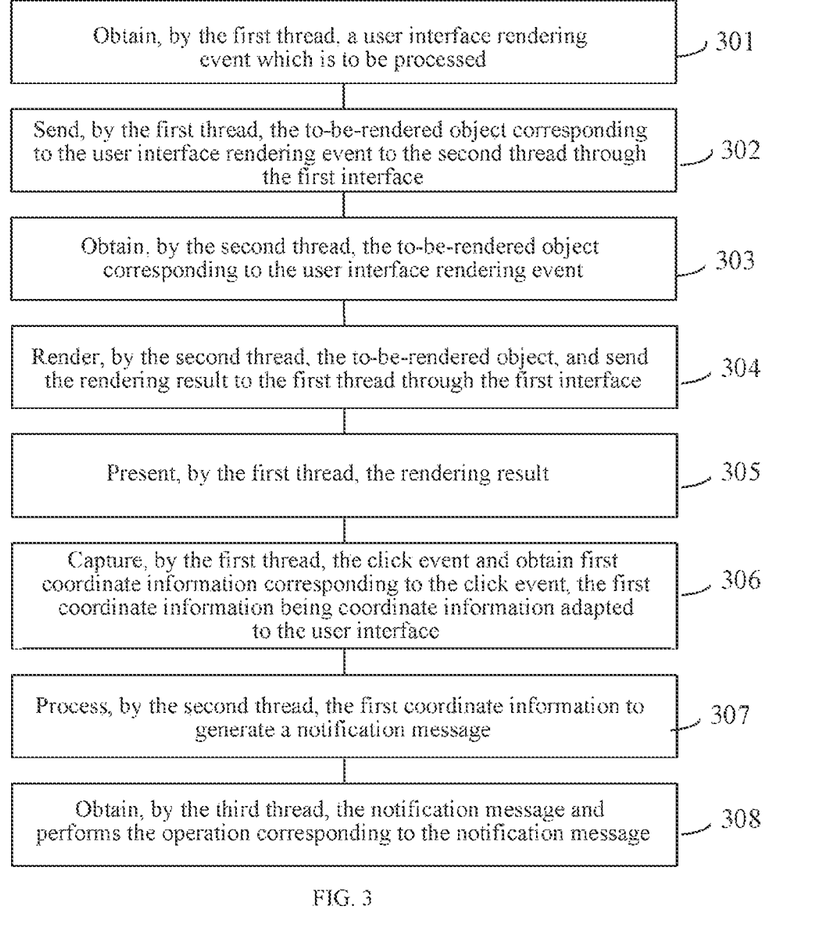
FIG. 3 is a flowchart of a user interface processing method according to an embodiment of the present disclosure.

FIG. 3 is a flowchart of a user interface processing method according to an embodiment of the present disclosure. The method is applied to a user terminal, and the user terminal is configured to execute a game client. The game client includes a first thread, a second thread and a third thread. The method may include the following steps:

In step 301, the first thread obtains a user interface rendering event which is to be processed.

In an implementation, when the user interface is opened, the user interface display thread can obtain the user interface to be rendered and the button icon to be rendered, and obtain the rendering object corresponding to the user interface and the button icon. The rendering object is texture data, and each texture data corresponds to a URL identifier.

In step 302, the first thread sends the to-be-rendered object corresponding to the user interface rendering event to the second thread through the first interface.

In an implementation, the user interface display thread may send the URL identifier corresponding to the to-be-rendered object to the browser kernel through a rendering event processing interface provided by the browser kernel, so that the browser kernel can conduct corresponding processes.

In step 303, the second thread obtains the to-be-rendered object corresponding to the user interface rendering event.

In an implementation, the browser kernel may obtain texture data corresponding to the user interface rendering event according to the URL identifier of the to-be-rendered object received in the rendering event processing interface.

In step 304, the second thread renders the to-be-rendered object, and sends the rendering result to the first thread through the first interface.

In an implementation, the browser kernel parses the URL identifier and obtains the corresponding texture data, and then renders the texture data. After the rendering is completed, the rendering result of each frame is stored in the rendering event processing interface in the format of bitmap, and the user interface display thread obtains the corresponding rendering result through the rendering event processing interface.

In step 305, the first thread displays or presents the rendering result.

In embodiments of the present disclosure, the first thread may obtain the rendering result corresponding to the user interface rendering event which is to be processed from the rendering event processing interface and present the rending result.

In step 306, the first thread captures the click event and obtains first coordinate information corresponding to the click event. The first coordinate information is coordinate information adapted to the user interface.

In embodiments of the present disclosure, the user interface includes an activity button and a functional button. The activity button is used to display a corresponding activity sub-interface, and the functional button may include a share button, a receive button, and a recharge button and so on. For example, if the user clicks the share button, sharing of game content is triggered. When the user clicks the receive button, the receiving of the corresponding gift is triggered. When the user clicks or taps the recharge button, the recharge of the user account is triggered.

In embodiments of the present disclosure, the first thread can capture the user's click event in the user interface and obtain the first coordinate information corresponding to the click event, and then send the first coordinate information to the second thread through the second interface provided by the second thread.

In an implementation, when the user clicks on the user interface, the user interface display thread captures the click event and performs determination regarding the click event. When the user clicks the active button, the user interface display thread determines that the click event is a rendering event, and steps 301 to 304 are performed. When the user clicks a functional button, the user interface display thread obtains the first coordinate information of the functional button corresponding to the click event, and then send the first coordinate information to the browser kernel through the click event processing interface provided by the browser kernel. The first coordinate information is the coordinate information of the functional button in the user interface, and each functional button corresponds to coordinate information in the user interface.

FIG. 2 is a schematic diagram of a user interface in a user interface processing method according to an embodiment of the present disclosure. When a user clicks a button of "Moonshine Gift", the user interface display thread determines that the click event is a rendering event, and the activity sub-interface corresponding to "Moonshine Gift" is rendered. When the user clicks the "Receive" button in the "Moonshine Gift" activity sub-interface, the user interface display thread can obtain the coordinate information corresponding to the "Receive" button.

It should be noted that, in the embodiments of the present disclosure, the coordinate information of the user interface is taken as an example for illustration. It can be understood that those skilled in the art may set according to actual needs, and the present disclosure does not limit this.

In step 307, the second thread processes the first coordinate information to generate a notification message.

In embodiments of the present disclosure, the first thread sends the first coordinate information to the second interface, the second interface stores the first coordinate information in the click event message queue, and then the second thread can obtain the first coordinate information from the click event message queue in the second interface, and process the first coordinate information to generate a notification message.

In an exemplary embodiment of the present disclosure, step 307 may include the following sub-steps:

In sub-step S11, the second thread converts the first coordinate information into second coordinate information, and the second coordinate information is coordinate information adapted to a page provided by the browser kernel.

In embodiments of the present disclosure, after acquiring the first coordinate information based on the user interface of the game client, the second thread may convert the first coordinate information into second coordinate information which is based on the browser page.

In an implementation, after a click event occurs on the user interface, the browser kernel can receive the first coordinate information, and then the browser kernel calls the logic layer of Javascript inside the web page to convert the first coordinate information to the second coordinate information, and thus convert the user interface click event performed by the user into a click on the webpage provided by the browser kernel. In this way, the browser kennel interacts with the thread in the game client through JsBridge, so that the game client and the Javascript in the webpage provided by the browser kernel can call each other.

In sub-step S12, the second thread uses the second coordinate information to generate a notification message for the second coordinate information.

In embodiments of the present disclosure, after the second thread converts the first coordinate information into the second coordinate information based on the browser page, a notification message for the second coordinate information may be generated.

In an implementation, the browser kernel calls the logic layer of Javascript in the webpage to convert the first coordinate information into the second coordinate information, and monitors that the second coordinate information has been selected, and then the browser kernel generates a notification message and notifies the game client to perform a corresponding operation. Notification inside the webpage can be performed through JSBridge, and then notification message is sent to the notification message queue in the click event processing interface, waiting for the third thread to obtain.

In step 308, the third thread obtains the notification message and performs the operation corresponding to the notification message.

In embodiments of the present disclosure, the third thread is a game data processing thread in the game client, which is responsible for processing game data in the game client and performing data exchange with a server. The third thread may obtain the notification message corresponding to the click event from the notification message queue in the second interface, and perform the operation corresponding to the notification message.

In an exemplary embodiment of the present disclosure, step 308 may include the following sub-steps:

In sub-step S21, the third thread obtains the notification message through the second interface.

In an implementation, the game data processing thread may obtain the notification message corresponding to the click event from the notification message queue in the click event processing interface, and then parse the notification message and determine the operation corresponding to the notification message.

In sub-step S22, the third thread performs the operation corresponding to the notification message.

In embodiments of the present disclosure, after determining the operation corresponding to the notification message, the third thread may perform the corresponding operation depending on the type of the button. For example, when the button is a sharing button, a sharing operation is performed; when the button is a "Receive" button, a corresponding reward is issued to the user; when the button is a recharge button, the corresponding recharging operation is performed.

In an implementation, after the game data processing thread determines the operation corresponding to the notification message, the game data processing thread can generate request information and send the request information to the server to obtain the corresponding data, and can also perform the corresponding operation through the game client.

In an example, after the game client obtains the notification message, the game client can perform determination regarding the notification message. For example, when the notification message is that the "Receive" button in the game client has been clicked, the game client can determine the user's game information. When the user meets the condition, the user is rewarded. When the user does not meet the condition, a prompt is provided, indicating that the user does not meet the condition, or the game client may directly jumps to corresponding task interface to notify the user to complete the task.

The embodiments of the present disclosure are applied to a user terminal that is configured to execute a game client. The game client includes a first thread and a second thread, and the second thread is a browser kernel pre-packaged in the game client. The first thread obtains the user interface rendering event which is to be processed, then the browser kernel obtains the to-be-rendered object corresponding to the user interface rendering event, the browser kernel renders the to-be-rendered object, and sends the rendering result to the first thread through the first interface. Then, the first thread displays the rendering result. In this way, the browser kernel performs the silent rendering in the background, and thus the user interface can be rendered more efficiently, thereby ensuring the consistency of the experience of the native WebView.

The first thread captures the click event and obtains the first coordinate information corresponding to the click event, then the browser kernel processes the first coordinate information to generate a notification message, and then the third thread obtains the notification message and executes the operation corresponding to the notification message. In this way, the user's click event on the user interface can be converted into the click event on the page in the browser kernel through the interactive between the first thread and the browser kernel and the interaction between the browser kernel and the third thread, while maintaining the native user interface. The method according to embodiments of the present disclosure can realizes the unification of the Webview interface of the user terminal operating platform, which further improves the experience of the native Webview of the game client.

It should be noted that, for simplicity of description, the method embodiments are expressed as a series of action combinations, but those skilled in the art should understand that the embodiments of the present disclosure are not limited by the sequence of actions described herein, because according to the embodiments of the present disclosure, some steps may be performed in other orders or simultaneously. Those skilled in the art should also understand that the embodiments described are all exemplary embodiments, and the actions are not necessarily required by all embodiments.

Figure 4:
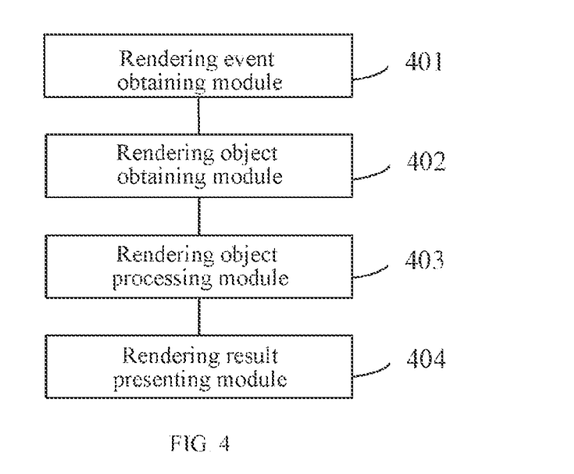
FIG. 4 is a block diagram of a user interface processing device according to an embodiment of the present disclosure.

FIG. 4 is a block diagram of a user interface processing device according to an embodiment of the present disclosure. The user interface processing device is applied to a user terminal. The user terminal is configured to execute a game client, the game client includes a first thread and a second thread, and the second thread is pre-packaged in a browser kernel of the game client. The device includes a rendering event obtaining module 401, a rendering object obtaining module 402, a rendering object processing module 403, and a rendering result presenting module 404.

The rendering event obtaining module 401 is configured to control the first thread to obtain a user interface rendering event which is to be processed.

The rendering object obtaining module 402 is configured to control the second thread to obtain a to-be-rendered object corresponding to the user interface rendering event.

The rendering object processing module 403 is configured to control the second thread to render the to-be-rendered object, and sending a rendering result to the first thread through a first interface, wherein the first interface is an interface provided by the second thread for storing the rendering result.

The rendering result presenting module 404 is configured to control the first thread to present the rendering result.

According to an exemplary embodiment of the present disclosure, the game client further includes a third thread, and the device may further include:

a first coordinate information obtaining module configured to control the first thread to capture a click event and obtaining first coordinate information corresponding to the click event, wherein the first coordinate information is coordinate information adapted to the user interface;

a notification message generation module configured to control the second thread to process the first coordinate information to generate a notification message; and a notification message processing module configured to control the third thread to obtain the notification message and perform an operation corresponding to the notification message.

According to an exemplary embodiment of the present disclosure, the second thread provides a second interface, and the device may further include:

a first coordinate information sending module configured to control the first thread to call the second interface and send the first coordinate information to the second thread.

According to an exemplary embodiment of the present disclosure, the notification message generation module may include:

a coordinate information conversion sub-module configured to control the second thread to convert the first coordinate information into second coordinate information, wherein the second coordinate information is coordinate information adapted to a page provided by the browser kernel; and a notification message generation sub-module configured to control the second thread to generate a notification message for the second coordinate information using the second coordinate information.

According to an exemplary embodiment of the present disclosure, the notification message processing module may include:

a notification message obtaining sub-module configured to control the third thread to obtain the notification message through the second interface; and a notification message processing sub-module configured to control the third thread to perform an operation corresponding to the notification message.

According to an exemplary embodiment of the present disclosure, the device may further include a to-be-rendered object sending module configured to control the first thread to send the to-be-rendered object corresponding to the user interface rendering event to the second thread through the first interface.

The device embodiments are corresponding to the method embodiments, and details can be found in the previous descriptions regarding the method embodiments.

An embodiment of the present disclosure provides a device, including:

one or more processors; and one or more machine-readable mediums having instructions stored thereon, wherein when the instructions are executed by the one or more processors, the device is caused to perform the user interface processing method according to embodiments of the present disclosure.

An embodiment of the present disclosure provides one or more machine-readable medium having instructions stored thereon, wherein when the instructions are executed by one or more processors, the one or more processors are caused to perform the user interface processing method according to embodiments of the present disclosure.

The embodiments are described in a progressive manner. Each embodiment focuses on the differences from other embodiments, and the same or similar parts between the embodiments may refer to each other.

Those skilled in the art should understand that the embodiments of the present disclosure may be provided as methods, devices, or computer program products. Therefore, the embodiments of the present disclosure may be embodied in the form of complete hardware, complete software, or a combination of software and hardware. Moreover, the embodiments of the present disclosure may be embodied in the form of a computer program product implemented on one or more computer-usable storage mediums (including but not limited to disk storage, CD-ROM, optical storage, etc.) containing computer-usable program codes.

The embodiments of the present disclosure are described with reference to the flowcharts and/or block diagrams of the methods, terminal devices (systems), and computer program products according to the embodiments of the present disclosure. It should be understood that each flow and/or block in the flowchart and/or block diagram and a combination of the flow and/or block in the flowchart and/or block diagram can be implemented by computer program instructions. These computer program instructions can be provided to a processor of a general-purpose computer, a special-purpose computer, an embedded processor, or other programmable data processing terminal device to generate a machine, so that when the instructions are executed by the processor of the computer or other programmable data processing terminal device, a device for realizing functions of one or more flows in the flowcharts and/or one or more blocks in the block diagrams can be generated.

These computer program instructions can be stored in a computer-readable memory that can guide a computer or other programmable data processing terminal device to work in a specific manner, so that the instructions stored in the computer-readable memory produce an article of manufacture including an instruction device. The instruction device realizes the functions of one or more flows in the flowcharts and/or one or more blocks in the block diagrams.

These computer program instructions can be loaded on a computer or other programmable data processing terminal device, so that a series of operation steps are executed on the computer or other programmable terminal device to produce computer-implemented processes, so that instructions executed on the computer or other programmable terminal device provide steps for realizing the functions of one or more flows in the flowcharts and/or one or more blocks in the block diagrams.

Although the exemplary embodiments of the present disclosure have been described, those skilled in the art can make additional changes and modifications to these embodiments once they learn the basic creative concept. Therefore, the appended claims are intended to be interpreted as encompassing the exemplary embodiments and all changes and modifications falling within the scope of the embodiments of the present disclosure.

It should be noted that relational terms such as first and second are only used to distinguish one entity or operation from another entity or operation, and do not necessarily require or imply that there is any such actual relationship or sequence between these entities or operations. Moreover, the terms "include", "comprise" or any other variants thereof are intended to cover non-exclusive inclusion, so that a process, method, article or terminal device including a series of elements not only includes those elements, but also includes those elements that are not explicitly listed, or also include elements inherent to this process, method, article or terminal device. If there are no more restrictions, the element defined by the sentence "including a . . . " does not exclude the existence of other same elements in the process, method, article or terminal device that includes the element.

The above provides a detailed description to a user interface processing method and a user interface processing device provided by the present disclosure. Specific examples are used to illustrate the principles and implementations of the present disclosure. The above embodiments are only used to help understand the methods and core ideas of the present disclosure for those of ordinary skill in the art, according to the ideas of the present disclosure, there may be changes in implementations and application ranges. Thus, the contents disclosed herein should not be construed as a limitation of the present disclosure.

What is claimed is:

1. A user interface processing method, applied to a user terminal, wherein the user terminal is configured to execute a game client, the game client comprises a first thread and a second thread, and the second thread is pre-packaged in a browser kernel of the game client, and the method comprises:
   obtaining, by the first thread, a user interface rendering event which is to be processed;
   obtaining, by the second thread, a to-be-rendered object corresponding to the user interface rendering event;
   rendering, by the second thread, the to-be-rendered object, and sending a rendering result to the first thread through a first interface, wherein the first interface is an interface provided by the second thread for storing the rendering result; and
   presenting, by the first thread, the rendering result.

2. The method according to claim 1, wherein the game client further comprises a third thread, and the method further comprises:
   capturing, by the first thread, a click event and obtaining first coordinate information corresponding to the click event, wherein the first coordinate information is coordinate information adapted to the user interface;
   processing, by the second thread, the first coordinate information to generate a notification message; and
   obtaining, by the third thread, the notification message and performing an operation corresponding to the notification message.

3. The method according to claim 2, wherein the second thread provides a second interface, and the method further comprises:
   calling, by the first thread, the second interface and sending the first coordinate information to the second thread.

4. The method according to claim 3, wherein obtaining, by the third thread, the notification message and performing an operation corresponding to the notification message comprises:
   obtaining, by the third thread, the notification message through the second interface; and
   performing, by the third thread, an operation corresponding to the notification message.

5. The method according to claim 2, wherein processing, by the second thread, the first coordinate information to generate a notification message, comprises:
   converting, by the second thread, the first coordinate information into second coordinate information, wherein the second coordinate information is coordinate information adapted to a page provided by the browser kernel; and
   generating, by the second thread, a notification message for the second coordinate information using the second coordinate information.

6. The method according to claim 1, further comprising:
   sending, by the first thread, the to-be-rendered object corresponding to the user interface rendering event to the second thread through the first interface.

7. A user interface processing device, applied to a user terminal, wherein the user terminal is configured to execute a game client, the game client comprises a first thread and a second thread, and the second thread is pre-packaged in a browser kernel of the game client, and the device comprises:
   a processor; and
   a memory for storing instructions executable by the processor;
   wherein the processor is configured to:
   control the first thread to obtain a user interface rendering event which is to be processed;
   control the second thread to obtain a to-be-rendered object corresponding to the user interface rendering event;
   control the second thread to render the to-be-rendered object, and sending a rendering result to the first thread through a first interface, wherein the first interface is an interface provided by the second thread for storing the rendering result; and
   control the first thread to present the rendering result.

8. The device according to claim 7, wherein the game client further comprises a third thread, and the processor is further configured to:

control the first thread to capture a click event and obtaining first coordinate information corresponding to the click event, wherein the first coordinate information is coordinate information adapted to the user interface;

the second thread to process the first coordinate information to generate a notification message; and control the third thread to obtain the notification message and perform an operation corresponding to the notification message.

9. The device according to claim 8, wherein the second thread provides a second interface, and the processor is further configured to:

control the first thread to call the second interface and send the first coordinate information to the second thread.

10. The device according to claim 9, wherein the processor is configured to:

control the third thread to obtain the notification message through the second interface; and control the third thread to perform an operation corresponding to the notification message.

11. The device according to claim 8, wherein the processor is configured to:

control the second thread to convert the first coordinate information into second coordinate information, wherein the second coordinate information is coordinate information adapted to a page provided by the browser kernel; and control the second thread to generate a notification message for the second coordinate information using the second coordinate information.

12. The device according to claim 7, wherein the processor is further configured to:

control the first thread to send the to-be-rendered object corresponding to the user interface rendering event to the second thread through the first interface.

13. A non-transitory machine-readable storage medium having instructions stored thereon, wherein when the instructions are executed by one or more processors of a terminal device which is configured to execute a game client, the one or more processors are caused to perform a user interface processing method the game client comprising a first thread and a second thread, and the second thread being pre-packaged in a browser kernel of the game client;

wherein the user interface processing method comprises:

obtaining, by the first thread, a user interface rendering event which is to be processed:

obtaining, by the second thread, a to-be-rendered object corresponding to the user interface rendering event;

rendering, by the second thread, the to-be-rendered object, and sending a rendering result to the first thread through a first interface, wherein the first interface is an interface provided by the second thread for storing the rendering result; and presenting, by the first thread, the rendering result.

14. The non-transitory machine-readable storage medium according to claim 13, wherein the game client further comprises a third thread, and the method further comprises:

capturing, by the first thread, a click event and obtaining first coordinate information corresponding to the click event, wherein the first coordinate information is coordinate information adapted to the user interface;

processing, by the second thread, the first coordinate information to generate a notification message; and obtaining, by the third thread, the notification message and performing an operation corresponding to the notification message.

15. The non-transitory machine-readable storage medium according to claim 14, wherein the second thread provides a second interface, and the method further comprises:

calling, by the first thread, the second interface and sending the first coordinate information to the second thread.

16. The non-transitory machine-readable storage medium according to claim 15, wherein obtaining, by the third thread, the notification message and performing an operation corresponding to the notification message comprises:

obtaining, by the third thread, the notification message through the second interface; and performing, by the third thread, an operation corresponding to the notification message.

17. The non-transitory machine-readable storage medium according to claim 14, wherein processing, by the second thread, the first coordinate information to generate a notification message, comprises:

converting, by the second thread, the first coordinate information into second coordinate information, wherein the second coordinate information is coordinate information adapted to a page provided by the browser kernel; and generating, by the second thread, a notification message for the second coordinate information using the second coordinate information.

18. The non-transitory machine-readable storage medium according to claim 13, wherein the method further comprises:

sending, by the first thread, the to-be-rendered object corresponding to the user interface rendering event to the second thread through the first interface.

* * * * *